United States Patent Office.

EBENEZER A. GOODES, OF PHILADELPHIA, PENNSYLVANIA.

Letters Patent No. 112,703, dated March 14, 1871.

IMPROVEMENT IN STAINING GLASS.

The Schedule referred to in these Letters Patent and making part of the same.

*To all whom it may concern:*

Be it known that I, EBENEZER A. GOODES, of the city and county of Philadelphia and State of Pennsylvania, have made a new and useful Process for Staining; and I do hereby declare the following to be a clear and exact description of the nature thereof, sufficient to enable others skilled in the art to which my invention relates to fully understand and use the same.

It is well known that silver possesses the property of permanently staining glass, and has long been used for that purpose, but the preparations heretofore employed are not adapted to receiving photographic impressions, and I am not aware that it has ever been demonstrated that a preparation of silver adapted to photography by the usual process still retains its property of staining glass, and as the light and shade of a photographic picture are formed by various degrees of intensity in the silver coating, it will produce precisely the same gradations in the stain, thus leaving permanently upon the glass a perfect *fac simile* of the photographic impression, even to its minutest details.

Designs which, by the present process, would require weeks of labor, can, by the application of photography, be produced in a few seconds, while, in regard to finish and detail, as in views from nature, &c., it would be utterly impossible for human hands to produce their equal.

By this process of staining glass there is also effected a saving of at least three-fourths of the amount of silver, yet the stain produced is equally as strong and clear as that obtained by the present process.

In carrying out my invention I proceed as follows:

The photograph is taken upon glass plate in the usual way, viz: the plate is coated with bromo-iodized collodion and excited in the silver bath; after which the picture is taken by the camera or other means. The latent picture is then developed by protosulphate of iron or pyrogallic acid, the latter being preferable. It is then "fixed" by immersion in a solution of cyanide of potassium or hyposulphate of soda, after which it is well washed and thoroughly dried.

The picture is now ready for the staining process, as follows:

The glass plate is placed in an air-tight kiln or otherwise subjected to a strong heat until every part of the photograph becomes a deep brown, care being taken that every part of the picture is equally heated. It is then gradually cooled, after which it may be placed in water, and the dark brown powder (probably an oxide of silver) will easily wash off, leaving a perfect copy of the photograph permanently stained upon the glass plate in tints varying from a pale yellow to a deep red or brown.

By this application of photography to the permanent staining of glass the most intricate and elaborate designs can be instantly placed upon glass for stores, halls, churches, cars, &c. Emblematic designs of complicated nature can be stained on glass for windows of society rooms and halls. Monograms, names, portraits, or pictures can be stained permanently upon manufactured articles of glass.

It can also be applied to ornamenting glass for lamp-shades or gas-fixtures, coach and car-lanterns, and for glass signs for hotels, stores, &c.; to permanently stain scale-marks upon gauges for steam-engines, pumps, &c.; and to the manufacture of clock-fronts and faces, and to many other useful purposes.

Having thus described my invention,

What I claim as new, and desire to secure by Letters Patent, is—

1. The photochemical process as above described, for permanently staining designs upon glass.

2. The application of light and heat to a salt of silver for the purpose of producing and permanently staining upon glass letters, designs, &c.

3. The combined use of collodion, salts of silver, iron, potassium, &c., when subjected to light and heat, for the purpose of permanently staining designs upon glass.

The above signed by me this 16th day of February, 1871.

E. A. GOODES.

Witnesses:
JOHN A. WIEDERSHEIM,
J. PLANKINTON.